United States Patent
Joshi et al.

(10) Patent No.: US 10,356,214 B2
(45) Date of Patent: Jul. 16, 2019

(54) COMPOSING MONOLITHIC APPLICATIONS BASED ON MULTI-CONTAINER APPLICATIONS

(71) Applicant: CA, Inc., Islandia, NY (US)

(72) Inventors: Prabodh Joshi, Islandia, NY (US); Mark Emeis, Islandia, NY (US); James Douglas Engquist, Islandia, NY (US); Dann M. Church, Islandia, NY (US)

(73) Assignee: CA, Inc., Islandia, NY (US)

( * ) Notice: Subject to any disclaimer, the term of this patent is extended or adjusted under 35 U.S.C. 154(b) by 281 days.

(21) Appl. No.: 15/472,726

(22) Filed: Mar. 29, 2017

(65) Prior Publication Data

US 2018/0287883 A1    Oct. 4, 2018

(51) Int. Cl.
| | |
|---|---|
| H04L 12/00 | (2006.01) |
| G06F 17/30 | (2006.01) |
| H04L 29/08 | (2006.01) |
| H04L 29/12 | (2006.01) |
| G06F 9/455 | (2018.01) |
| G06F 8/61 | (2018.01) |

(52) U.S. Cl.
CPC .............. H04L 67/34 (2013.01); G06F 9/455 (2013.01); G06F 9/45558 (2013.01); H04L 61/1511 (2013.01); G06F 8/63 (2013.01); G06F 2009/45583 (2013.01); G06F 2009/45595 (2013.01); H04L 61/2528 (2013.01)

(58) Field of Classification Search
CPC . H04L 67/34; H04L 61/1511; H04L 61/2528; G06F 9/455; G06F 9/45558; G06F 8/63; G06F 2009/45583; G06F 2009/45595

USPC ........ 709/223, 224, 225, 231; 707/812, 821, 707/822
See application file for complete search history.

(56) References Cited

U.S. PATENT DOCUMENTS

| | | | | |
|---|---|---|---|---|
| 7,069,270 | B1 * | 6/2006 | Kumar | G06F 9/44505 |
| 8,556,713 | B2 * | 10/2013 | Pilip | A63F 13/63 |
| | | | | 463/29 |
| 2009/0187919 | A1 | 7/2009 | Maes | |
| 2011/0092279 | A1 * | 4/2011 | Pilip | A63F 13/77 |
| | | | | 463/29 |
| 2013/0124693 | A1 | 5/2013 | Kato et al. | |
| 2014/0195663 | A1 | 7/2014 | Hirschenberger et al. | |

(Continued)

FOREIGN PATENT DOCUMENTS

WO    WO-2011048546 A2 *    4/2011    .............. A63F 13/77

OTHER PUBLICATIONS

How to Migrate Legacy Applications into Docker Containers, https://web.archive.org/web/20161019143955/https://www.ctl.io/developers/blog/post/how-to-migrate-legacy-applications-into-docker-containers, Oct. 19, 2016, pp. 1 to 7.

(Continued)

*Primary Examiner* — Frantz Coby
(74) *Attorney, Agent, or Firm* — Pillsbury Winthrop Shaw Pittman LLP

(57) ABSTRACT

Provided is a process configured to convert a multi-container application into a monolithic application, the process including: obtaining a multi-container application; converting the multi-container application into a monolithic application; forming an installation package comprising the monolithic application; and storing the installation package in memory.

20 Claims, 3 Drawing Sheets

(56) References Cited

U.S. PATENT DOCUMENTS

2015/0178099 A1 6/2015 Diester et al.
2016/0308982 A1 10/2016 Greene
2018/0278725 A1* 9/2018 Thayer .................... H04L 69/08

OTHER PUBLICATIONS

Refactoring a Monolith into Microservices, hhttps://web.archive.org/web/20161015012052/https://www.nginx.com/blog/refactoring-a-monolith-into-microservices/, Oct. 15, 2016, pp. 1 to 8.
One Software Container to Enclose Them All, https://web.archive.org/web/20170220102445/http://www.nextplatform.com/2015/05/08/one-software-container-to-enclose-them-all/, Feb. 20, 2017, pp. 1 to 6.

* cited by examiner

COMPOSING MONOLITHIC APPLICATIONS BASED ON MULTI-CONTAINER APPLICATIONS

BACKGROUND

1. Field

The present disclosure relates generally to containerized applications and, more specifically, to composing monolithic applications based on multi-container applications.

2. Description of the Related Art

Distributed applications are computer applications implemented across multiple hosts. The hosts may be a group of computers, virtual machines, or containers, and often each execute at least part of the application's code and cooperate to provide the functionality of the application. Examples include client-server architectures, in which a client computer cooperates with a server to provide functionality to a user. Another example is an application having components replicated on multiple computers behind a load balancer to provide functionality at larger scales than a single computer. Some examples have different components on different computers that execute different aspects of the application, such as a database management system, a storage area network, a web server, an application program interface server, and a content management engine.

The different components of such applications often expose functionality via a network address and are characterized as "services." Services may be composed of a variety of other services, which may themselves be composed of other services. Examples of a service include an application component (e.g., one or more executing bodies of code) that communicates via a network (or loopback network address) with another application component, often by monitoring network socket of a port at a network address of the computer upon which the service executes.

Often these services are executed within computational entities that provide a standardized interface to underlying computing hardware and isolate the services on the same computing device from one another. Examples include virtual machines and containers. Interfaces provided by these types of computational entities are often consistent across different types of computing hardware, making it often much easier to add and remove computing resources, transition computing resources between different cloud computing providers, and focus developer effort on the functionality and performance of the application rather than the specifics of the hardware. Further, in many cases these computational entities isolate computing environments from one another within the same computing device, facilitating cotenancy on a single computing device and more freedom to scale and allocate computing resources with granularity.

As containerized applications become more common, it is expected that there will be a need for monolithic-application versions of multi-container applications. In many cases, applications designed for containerized environments may not be made available to those operating in environments where containers are not supported or where network communications between containers is not available. For example, many enterprise computing environments have not converted to containerized environments, and many mobile computing devices or other computing devices with limited computing resources or limited network connectivity are not suitable for running multi-container applications.

SUMMARY

The following is a non-exhaustive listing of some aspects of the present techniques. These and other aspects are described in the following disclosure.

Some aspects include a process including: obtaining, with one or more processors, a multi-container application, the multi-container application comprising: a composition file identifying a plurality of container images configured to provide respective services of the multi-container application upon deployment and execution in a respective container of the multi-container application, and the plurality of container images, wherein the container images each comprise different application components of the multi-container application configured to effectuate a different respective service of the multi-container application, the applications components having different application code and different dependencies stored in the respective container images; converting, with one or more processors, the multi-container application into a monolithic application at least in part by: consolidating the application components and dependencies into a single filesystem, and converting code operative to, at least in part, effectuate application-program interface (API) commands sent between the services of the multi-container application to be operative to cause the command to be sent and delivered internal to a single computing device configured to execute the monolithic application; forming, with one or more processors, an installation package comprising the monolithic application, resources used by the monolithic application, and a manifest file describing components of the monolithic application and an entry point for execution of the monolithic application; and storing, with one or more processors, the installation package in memory.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
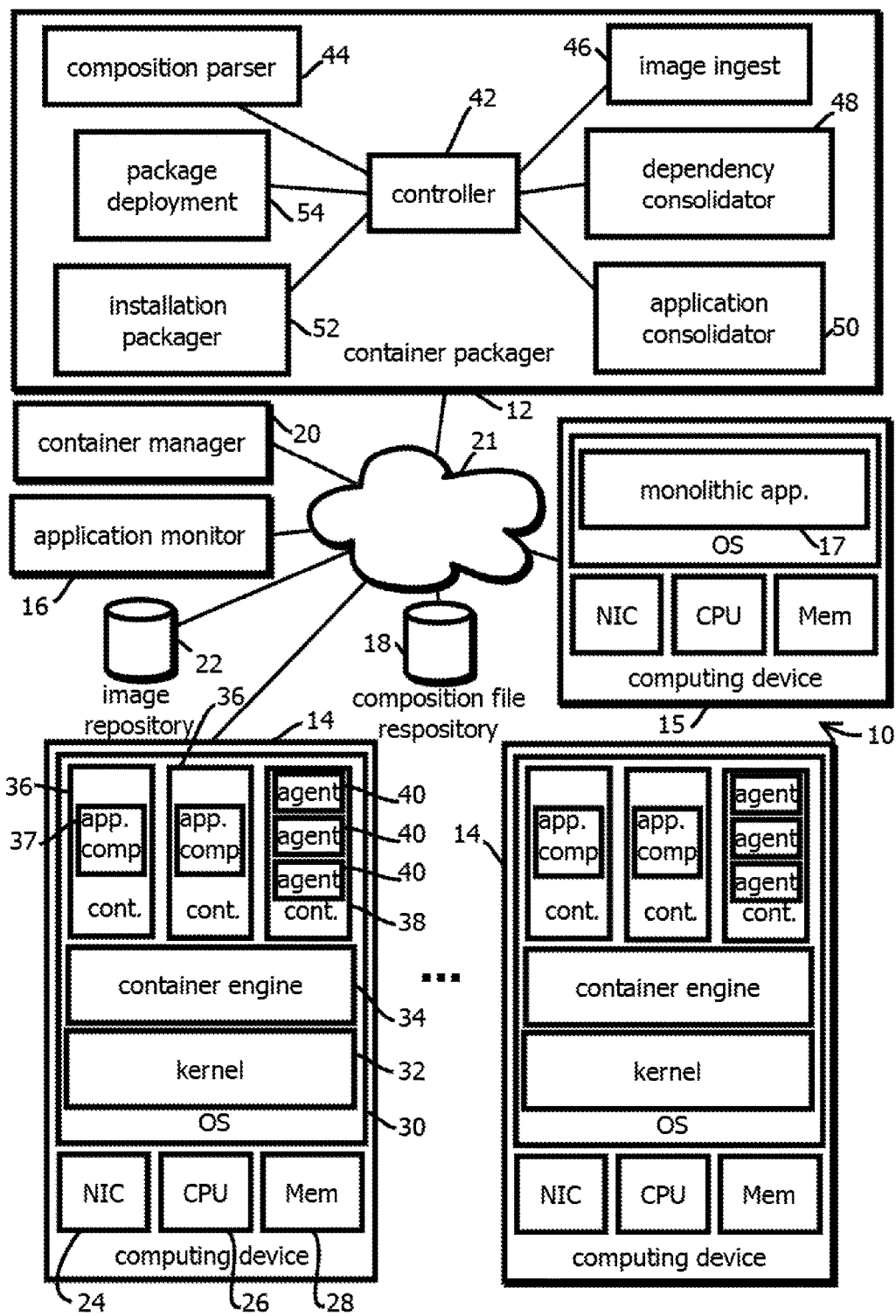
FIG. 1 is a block diagram of a computing environment including a container packager in accordance with some embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of containerized-application development. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some of the above issues, as well as other issues described below or that will be apparent to one of ordinary skill in the art, may be mitigated by some embodiments of a system described below with reference to FIG. 1 and a process described below with reference to FIG. 2. Some embodiments may convert multi-container applications into monolithic applications, i.e., applications suitable for installation and execution within a single computing device that does not use a container engine to separate different processes of the application. To effectuate the conversion, in some cases, embodiments may detect and resolve conflicts in filesystem namespaces, program state namespaces, dependency versions, and the like between containers. Further, some embodiments may reconfigure container-to-container communications to occur within a single computing device, for instance, through configuration of loopback IP addresses, converting application program interface (API) requests across networks into system calls to corresponding executables, or converting such API requests into function calls. Some embodiments may output and store an installation package suitable for installing the monolithic application on a single computing device, and in some cases, on a mobile computing device.

To these ends and others, as shown in FIG. 1, some embodiments are implemented in a computing environment 10 having a container packager 12 operative to perform one or more of the various types of above-described conversions. In some embodiments, the container packager 12 may convert a multi-container distributed application configured to be run on a plurality of computing devices 14 in a containerized environment into an application configured to be executed on a computing device 15 as a monolithic application 17. The container packager 12 is best understood in view of the other components of the computing environment 10 in which some embodiments of the container packager 12 may be deployed. The computing environment 10 also illustrates an example of a multi-container application deployed both as a multi-container application and as a monolithic application after conversion.

In some embodiments, the computing environment 10 may include the container packager 12, a plurality of computing devices 14, an application monitor 16 of a monitoring application, a composition file repository 18, a container manager 20, and an image repository 22. These components may communicate with one another via a network 21, such as the Internet and various local area networks.

In some embodiments, the computing environment 10 may execute a plurality of different distributed applications, in some cases intermingling components of these distributed applications on the same computing devices and, in some cases, with some of the distributed applications providing software tools by which other distributed applications are deployed, monitored, and adjusted. It is helpful to generally discuss these applications before addressing specific components thereof within the computing environment 10. In some cases, such applications may be categorized as workload applications and infrastructure applications. The workload applications may service tasks for which the computing environment is designed and provided, e.g., hosting a web-based service, providing an enterprise resource management application, providing a customer-relationship management application, providing a document management application, providing an email service, or providing an industrial controls application, just to name a few examples. In contrast, infrastructure applications may exist to facilitate operation of the workload application. Examples include monitoring applications, logging applications, container management applications, and the like.

In some embodiments, the computing devices 14 may execute a (workload or infrastructure) distributed application that is implemented through a collection of services that communicate with one another via the network 21. Examples of such services include a web server that interfaces with a web browser executing on a client computing device via network 21, an application controller that maps requests received via the web server to collections of responsive functional actions, a database management service that reads or writes records responsive to commands from the application controller, and a view generator that dynamically composes webpages for the web server to return to the user computing device. Some examples have different components on different computers that execute different aspects of the application, such as a database management system, a storage area network, a web server, an application program interface server, and a content management engine. Other examples include services that pertain to other application program interfaces, like services that process data reported by industrial equipment or Internet of things appliances. Often, the number of services is expected to be relatively large, particularly in multi-container applications implementing a microservices architecture, where functionality is separated into relatively fine-grained services of a relatively high number, for instance more than 10, more than 20, or more than 100 different microservices. In some cases, there may be multiple instances of some of the services, for instance behind load balancers, to accommodate relatively high computing loads, and in some cases, each of those instances may execute within different containers on the computing devices as described below. These applications can be characterized as a service composed of a variety of other services, which may themselves be composed of other services. Services composed of other services generally form a service hierarchy (e.g., a service tree) that terminates in leaf nodes composed of computing hardware each executing a given low level service. In some cases, a given node of this tree may be present in multiple trees for multiple root services.

As multi-container applications or other distributed applications have grown more complex in recent years, and the scale of computing loads has grown, many distributed applications have been designed (or redesigned) to use more, and more diverse, services. Functionality that might have previously been implemented within a single thread on a single computing device (e.g., as different sub-routines in a given executable) has been broken-up into distinct services that communicate via a network interface, rather than by function calls within a given thread. Services in relatively granular architectures are sometimes referred to as a "microservice." These microservice architectures afford a number of benefits, including ease of scaling to larger systems by instantiating new components, making it easier for developers to reason about complex systems, and increased reuse of code across applications. It is expected that industry will move towards increased use of microservices in the future, which is expected to make the above-describe problems even more acute.

Each service is a different program or instance of a program executing on one or more computing devices. Thus, unlike different methods or subroutines within a program, the services in some cases do not communicate with one another through shared program state in a region of memory assigned to the program by an operating system on a single computer and shared by the different methods or subroutines (e.g., by function calls within a single program). Rather, the different services may communicate with one another through network interfaces, for instance, by messaging one another with application program interface (API) commands (having in some cases parameters applicable to the commands) sent to ports and network addresses associated with the respective services (or intervening load balancers), e.g., by a local domain-name service configured to provide service discovery. In some cases, each port and network address pair refers to a different host, such as a different computing device, from that of a calling service. In some cases, the network address is a loopback address referring to the same computing device. Interfacing between services through network addresses, rather than through shared program state, is expected to facilitate scaling of the distributed application through the addition of more computing systems and redundant computing resources behind load balancers. In contrast, often a single computing device is less amenable to such scaling as hardware constraints on even relatively high-end computers can begin to impose limits on scaling relative to what can be achieved through distributed applications.

In some cases, each of the services may include a server (e.g., a process that monitors a network socket) that monitors a network address and port associated with the service (e.g., an instance of a service with a plurality of instances that provide redundant capacity). In some embodiments, the server (e.g., a server process executing on the computing device) may receive messages, parse the messages for commands and parameters, and call appropriate routines to service the command based on the parameters. In some embodiments, some of the servers may select a routine based on the command and call that routine.

The distributed application may be any of a variety of different types of distributed applications, in some cases implemented in one or more data centers. In some cases, the distributed application is a software-as-a-service SaaS application, for instance, accessed via a client-side web browser or via an API. Examples include web-based email, cloud-based office productivity applications, hosted enterprise resource management applications, hosted customer relationship management applications, document management applications, human resources applications, Web services, server-side services for mobile native applications, cloud-based gaming applications, content distribution systems, and the like. In some cases, the illustrated distributed application interfaces with client-side applications, like web browsers via the public Internet, and the distributed application communicates internally via a private network, like a local area network, or via encrypted communication through the public Internet.

As discussed, distributed applications are often relatively complex and difficult for developers and operations engineers to reason about. To help make these applications more manageable, often monitoring applications and other infrastructure applications are installed alongside the distributed application to gather information about the underlying computers upon which the distributed application is executing or performance of application components.

In some cases, the monitoring application may communicate via a different network than that of the distributed application. For instance, the monitoring application may communicate via an out-of-band network in a data center, while the distributed application may communicate via an in-band network. Out-of-band communications are expected to reduce an attack surface of the distributed application by maintaining at least some interfaces of the monitoring application on a network that is not exposed to the public Internet. Or in some cases, these communications may be consolidated on a single network, for instance to simplify the physical architecture.

Two computing devices 14 are shown, but embodiments may have only one computing device or include many more, for instance, numbering in the dozens, hundreds, or thousands or more. In some embodiments, the computing devices 14 may be rack-mounted computing devices in a data center, for instance, in a public or private cloud data center. In some embodiments, the computing devices 14 may be geographically remote from one another, for instance, in different data centers, and geographically remote from the other components illustrated, or these components may be collocated (or in some cases, all be deployed within a single computer).

In some embodiments, the network 21 includes the public Internet and a plurality of different local area networks, for instance, each within a different respective data center connecting to a plurality of the computing devices 14. In some cases, the various components may connect to one another through the public Internet via an encrypted channel. In some cases, a data center may include an in-band network through which the data operated upon by the application is exchanged and an out-of-band network through which infrastructure monitoring data is exchanged. Or some embodiments may consolidate these networks.

In some embodiments, each of the computing devices 14 may execute a variety of different routines specified by installed software, which may include workload application software, monitoring software, and an operating system. The monitoring software may monitor, and, in some cases manage, the operation of the application software or the computing devices upon which the application software is executed. Thus, the workload application software does not require the monitoring software to serve its purpose, but with the complexity of modern application software and infrastructure, often the monitoring software makes deployments much more manageable and easy to improve upon.

In many cases, the application software is implemented with different application components executing on the different hosts (e.g., computing devices, virtual machines, or containers). In some cases, the different application components may communicate with one another via network messaging, for instance, via a local area network, the Internet, or a loopback network address on a given computing device. In some embodiments, the application components communicate with one another via respective application program interfaces, such as representational state transfer (REST) interfaces, for instance, in a microservices architecture. In some embodiments, each application component includes a plurality of routines, for instance, functions, methods, executables, or the like, in some cases configured to call one another. In some cases, the application components are configured to call other application components executing on other hosts, such as on other computing devices, for instance, with application program interface request including a command and parameters of the command. In some cases, some of the application components may be identical to other application components on other hosts, for instance, those provided for load balancing purposes in order to concurrently service transactions. In some cases, some of the application components may be distinct from one another and serve different purposes, for instance, in different stages of a pipeline in which a transaction is processed by the distributed application. An example includes a web server that receives a request, a controller that composes a query to a database based on the request, a database that services the query and provides a query result, and a view generator that composes instructions for a web browser to render a display responsive to the request to the web server. Often, pipelines in commercial implementations are substantially more complex, for instance, including more than 10 or more than 20 stages, often with load-balancing at the various stages including more than 5 or more than 10 instances configured to service transactions at any given stage. Or some embodiments have a hub-and-spoke architecture, rather than a pipeline, or a combination thereof. In some cases, multiple software applications may be distributed across the same collection of computing devices, in some cases sharing some of the same instances of application components, and in some cases having distinct application components that are unshared.

With the complexity that can arise in distributed applications, it can be difficult to diagnose application performance issues or infrastructure issues. Accordingly, some embodiments include monitoring software. The monitoring software may be distinct types that, while they each perform monitoring, perform functions recognized as in industry as being in distinct product categories traditionally. Examples include infrastructure monitoring and application performance monitoring. The former can be analogized to the diagnostic software used by an automotive mechanic to monitor a car's engine, while the latter can be analogized to GPS navigation software by which a car's direction and speed is tracked. Both relate to the operation of the car, but they are distinct categories of software. A similar relationship exists for application performance monitoring and infrastructure monitoring applications. Commercial examples of each include the following.

CA Unified Infrastructure Management (UIM)™ available from CA, Inc. of Islandia, N.Y. may be used to monitor and manage data center deployments and, in particular, those in a multi-tenancy use case, like in the enterprise cloud (e.g., Amazon Web Services™ or Azure™). Some implementations automatically discover computing devices, gather metrics (like CPU usage, memory usage, network activity, etc.) and alarms about the devices, and some implementations aggregate the data in various dashboards and reports. In some cases, this data is gathered and reported to a central server by an agent installed on monitored devices. An administrator console may be used to manually configure and deploy the monitoring agents, also called robots, which may be configured to have "probes," or collections of code configured to monitor a particular type of software. Such probes may be characterized as agents in and of themselves more generally.

CA Application Performance Management (APM)™ available from CA, Inc. of Islandia, N.Y. may be used to monitor the performance of applications by providing fine-grained response times (and other metrics) attributable to portions of a call graph of the application (e.g., indicating which method, of the application called is servicing a request or is running particularly slow). In some cases, this is done by instrumenting the monitored code. An agent may execute on the computing device to receive signals from instrumented code or otherwise monitor the code through operating system interfaces. Embodiments may aggregate such data and present transaction traces that indicate the amounts of time consumed in servicing a user request attributable to various methods and services called when preparing the response to the request.

CA Application Delivery Analysis™ (ADA) available from CA, Inc. of Islandia, N.Y. may also be used to monitor the performance of software, e.g., providing relatively fine-grained measures response time viewed through the lens of network infrastructure. A developer or engineer may use CA ADA to determine that one of 50 servers in distributed system is responsible for a slowdown in a particular application feature for a subset of users. ADA may operate on layer-four of the Open Systems Interconnection (OSI) model, often the transport layer, such as on transport control protocol (TCP) metadata, like packet headers. By monitoring network exchanges, ADA may infer the as-built topology of a distributed application (e.g., what hosts are in a topology (and how they connect in the topology) and where there is redundancy in the topology). Often these topologies have one or more entry hosts (e.g., a web or API server) and a set of downstream hosts that perform back-end processes (e.g., controllers, databases, load balancers, servers that interface with third party API's, etc.).

The illustrated application monitor 16 may be a centralized server that controls various types of monitoring applications. In some embodiments, the infrastructure monitoring software may be a distributed infrastructure management application that includes a centralized infrastructure application monitor 16 that consolidates information and controls application agents and infrastructure agents installed on the computing devices 14. In some embodiments, the infrastructure agent may be installed on networking equipment as well, for instance, on switches and routers. Or some embodiments are partially or entirely agentless, and metrics, events, and attributes may be gathered with the various protocols described below for this purpose or from instrumented workload application code.

In some embodiments, the infrastructure agent is configured to gather attributes of the computing host upon which the infrastructure agent executes, such as a host name (or other type of host identifier), a network address, a medium access control address, a domain name service, a data center identifier, a data center region, a processor model, a processor speed, amounts of processor memory of various types of cache (e.g. L1 and L2), an operating system name, an operating system version, operating system configurations, firmware names, firmware versions, driver names, driver versions, installed application names, installed application versions, amounts of memory available in random access memory, memory speed, amounts of persistent storage available, persistent storage speed, and the like. In some embodiments, the infrastructure agent is configured to gather metrics of the host upon which the infrastructure agent executes, for instance, processor utilization, memory utilization, temperature, network bandwidth, network latency, rates of packet loss on networks, and the like. In some embodiments, the infrastructure agent is configured to gather events, such as alarms, indicative of occurrences at the host upon which the infrastructure agent executes, for instance, instances of the above metrics crossing (or changing faster than) a threshold, operating system errors, crashes, reboots, corrupted memory being detected, and the like.

In some embodiments, the infrastructure agent may be configured to report such gathered information to a centralized infrastructure monitor (such as application monitor 16), for instance, periodically, and buffer the information between reports. In some embodiments, the infrastructure agent may be configured to receive requests for such information from the infrastructure monitor and respond with responsive information, for instance, all information buffered, or information responsive to a query from the infrastructure monitor.

In some embodiments, the infrastructure agent may include a plurality of "probes," which may be routines configured to gather information pertaining to a particular use case for the host, for example, probes configured to gather information about databases, email servers, web servers, and the like. In some embodiments, some infrastructure agents may have a plurality of probes and a different infrastructure agents may have different pluralities of probes. Or in other architectures consistent with the present techniques, each "probe" may be characterized as an agent, e.g., a single host may have multiple specialized infrastructure or application performance monitoring agents.

In some use cases, system administrators do not have a way to easily take inventory of the computing devices upon which a given distributed application or plurality of distributed applications execute. Often computing devices or hosts executing thereon, are added and removed relatively frequently, often over diverse geographic areas, in some cases automatically responsive to changes in the applied load or crashes or maintenance elsewhere in the system. To ease this burden, some embodiments of the infrastructure monitor (such as application monitor 16) are configured to automatically discover newly added hosts within a domain, for instance, new virtual machines that were added or new computing devices that were added. In some cases, the infrastructure monitor may periodically, or in response to a command, scan a range of network addresses, like in a private subnet, with request sent according to various network management protocols, like Simple Network Management Protocol (SNMP), Secure Shell (SSH), Windows Management Instrumentation (WMI), or Internet Control Message Protocol (ICMP). If a computing device is not at a given address in the range, no response may be received within a threshold duration of time, and that address may be disregarded. In contrast, a new computing device or other host at a given address, upon receiving the network management protocol request may respond to the request, indicating the presence of a host. Upon detecting a new host, some embodiments of the infrastructure monitor may direct the host to install an instance of the infrastructure agent and, in some cases, configure various probes thereon based upon a role indicated by the host.

In some embodiments, the infrastructure monitor may receive information reported from the infrastructure agents and generate various dashboards, reports, and alarms based on this information. In some embodiments, the infrastructure monitor is further configured to automatically take remedial action, for instance, provisioning additional computing devices responsive to thresholds being exceeded, like thresholds indicating CPU or memory usage greater than a threshold amount. In some embodiments, the infrastructure monitor may organize the received information according to an identifier of a host upon which the infrastructure agent reporting the information is executing. Based upon discovered hosts, and in some cases information reported by those hosts, some embodiments of the infrastructure monitor may construct a network-architecture topology of a physical architecture of computing devices within a domain. In some cases, this network-architecture topology may include network-architecture host identifiers for each of the hosts that were discovered or otherwise identified (for instance, manually identified and configured by a system administrator). In some cases, these host identifiers may be specified by a system administrator, or in some cases, the host itself.

In some embodiments, as discussed above, the monitoring software further includes application performance management software. For example, some embodiments may include a distributed application performance management application including the application monitor 16 and an application agent (or plurality of application agents) executing on the computing devices 14. In some embodiments, the application agents may be configured to monitor performance of an associated application component, e.g., executing on the same computing device 14. Monitoring performance may take a number of forms, and examples include measuring response times of various routines of the application component, for instance, durations of times elapsed between when a given routine is called and when the given routine returns a response. Other examples include gathering errors thrown by routines. In some embodiments, routines may be instrumented by adding calls to the application agent at the beginning and ends of the routines, such that the application agent receives a signal when a given routine in a given execution instance begins and ends, and the application agent may determine response times based on the signals by subtracting the time at which the begin signal was received from the time at which the end signal was received. In some embodiments, these routines may receive such signals from an operating system of a host. In some cases, the application agent and application component may be configured before both are installed on a computing device. For instance, code for the application component may be instrumented with calls to the application agent before that code is installed in a machine image or the computing device 14 that receives that machine image.

In some embodiments, the application agent may gather attributes, metrics, and events of application components and report that gathered information to the application monitor 16, for instance, buffering the information and sending it periodically or sending the information responsive to queries. In some embodiments, the application monitor 16 may aggregate information gathered from a plurality of application agents executing on the computing devices 14 for a given distributed application and generate various dashboards, reports, and alarms. In some embodiments, the application monitor 16 may be configured to group reported metrics according to a given transaction serviced by the distributed application. For instance, a given website request and the chain of events in a pipeline by which the given website request is serviced is an example of a transaction. In many cases, the distributed application may service a relatively large number of transactions concurrently, for instance, after a relatively large number of users make requests at around the same time. Some embodiments may be configured to, for a given transaction, determine a total response time for the transaction, for instance, as perceived by a user, indicating a difference in time between when a request was received and when a response was provided for a user. Further, some embodiments may be configured to segment that response time for the transaction according to the contribution of each of the application components and routines therein. The various reports analyses, and dashboards described herein may be formed by instructing a computing device to render a graphical user interface depicting the same, for instance, by sending instructions to a web browser on a remote computing device or instructing a display of a computing device upon which the monitor 16 is executing. Thus, in some cases, a developer may be able to query the application monitor 18 for particularly slow transactions (or transactions for which an error occurred) and drill down into the particular application component and routine that contributed to the slow response or error.

Some embodiments may include multiple types of monitoring applications, e.g., with multiple respective application monitors 16 and agents co-hosted on computing devices 14. Or some embodiments may include a single type of monitoring application. Thus, in some embodiments, the computing environment 10 may execute a distributed application and a monitoring application on a plurality of computing devices 14. As a result, in some cases, each of the computing devices 14 may be configured to implement different portions of the applications.

In some embodiments, the computing devices 14 and each include a network interface 24, a central processing unit 26, and memory 28. Examples of these components are described in greater detail below with reference to FIG. 3. Generally, the memory 28 may store a copy of program code that when executed by the CPU 26 gives rise to the software components described below. In some embodiments, the different software components may communicate with one another or with software components on other computing devices via a network interface 24, such as an Ethernet network interface by which messages are sent over a local area network, like in a data center or between data centers. In some cases, the network interface 24 includes a physical-interface (PHY) module configured to send and receive signals on a set of wires or optical cables, a medium-access control (MAC) module configured to manage shared access to the medium embodied by the wires or cables, a controller executing firmware that coordinates operations of the network interface, and a pair of first-in-first-out buffers that respectively store network packets being sent or received before or after the packets are transferred to or from system memory via direct memory access.

In some embodiments, each of the computing devices 14 executes one or more operating systems 30, in some cases with one operating system nested within another, for instance, with one or more virtual machines executing within an underlying base operating system. In some cases, a hypervisor may interface between the virtual machines and the underlying operating system, e.g., by simulating the presence of standardized hardware for software executing within a virtual machine.

In some embodiments, the operating systems 30 include a kernel 32. The kernel may be the first program executed upon booting the operating system. In some embodiments, the kernel may interface between applications executing in the operating system and the underlying hardware, such as the memory 28, the CPU 26, and the network interface 24.

In some embodiments, code of the kernel 32 may be stored in a protected area of memory 28 to which other applications executing in the operating system do not have access. In some embodiments, the kernel may provision resources for those other applications and process interrupts indicating user inputs, network inputs, inputs from other software applications, and the like. In some embodiments, the kernel may allocate separate regions of the memory 28 to different user accounts executing within the operating system 30, such as different user spaces, and within those user spaces, the kernel 32 may allocate memory to different applications executed by the corresponding user accounts in the operating system 30.

In some embodiments, the operating system 30, through the kernel 32, may provide operating-system-level virtualization to form multiple isolated user-space instances that appear to an application executing within the respective instances as if the respective instance is an independent computing device. In some embodiments, applications executing within one user-space instance may be prevented from accessing memory allocated to another user-space instance. In some embodiments, filesystems and filesystem namespaces may be independent between the different user-space instances, such that the same filesystem path in two different user-space instances may point to different directories or files. In some embodiments, this isolation and the multiple instances may be provided by a container engine 34 that interfaces with the kernel 32 to effect the respective isolated user-space instances.

In some embodiments, each of the user-space instances may be referred to as a container. In the illustrated embodiment three containers 36 and 38 are shown, but embodiments are consistent with substantially more, for instance more than 5 or more than 20. In some embodiments, the number of containers may change over time, as additional containers are added or removed, e.g., dynamically based on workload or in response to failure of a container. A variety of different types of containers may be used, including containers consistent with the Docker™ standard and containers consistent with the Google Kubernetes™ standard. Containers may run within a virtual machine or within a non-virtualized operating system, but generally containers are distinct from these computational entities. Often, virtual machines emulate the hardware that the virtualized operating system runs upon and interface between that virtualized hardware and the real underlying hardware. In contrast, containers may operate without emulating the full suite of hardware, or in some cases, any of the hardware in which the container is executed. As a result, containers often use less computational resources than virtual machines, and a single computing device may run more than four times as many containers as virtual machines with a given amount of computing resources.

In some embodiments, multiple containers may share the same Internet Protocol address of the same network interface 24. In some embodiments, messages to or from the different containers may be distinguished by assigning different port numbers to the different messages on the same IP address. Or in some embodiments, the same port number and the same IP address may be shared by multiple containers. For instance, some embodiments may execute a reverse proxy by which network address translation is used to route messages through the same IP address and port number to or from virtual IP addresses of the corresponding appropriate one of several containers.

In some embodiments, various containers 36 and 38 may serve different roles. In some embodiments, each container may have one and only one thread, or sometimes a container may have multiple threads. In some embodiments, the containers 36 may execute application components 37 of the distributed application being monitored, and the container 38 may execute agents 40 of the monitoring application. In some embodiments, each of the application components 37 corresponds to an instance of one of the above-described services. And in some embodiments, the agents 40 may correspond to one of the above-described types of agents. In some embodiments, a single agent may have multiple configurable probes corresponding to the plurality of agents 40 shown in FIG. 1. In some embodiments, some of the agents 40 may monitor the computing device 14, for instance, gathering metrics about CPU usage, memory usage, bandwidth usage, and the like. In some embodiments, some of the agents 40 may monitor corresponding ones of the application components 37. For instance, an agent may correspond to a particular type of server, like an Apache Tomcat™ server, and that agent 40 may monitor the corresponding server and the corresponding container. Similar application component specific mappings may apply to a variety of other types of services, like those described above.

In some cases, the host may be a virtual machine executing on the computing device, thereby facilitating use of public clouds in which potentially different virtual machines from different user accounts are executing on the same computing device.

In some embodiments, infrastructure applications in the computing environment 10 may be configured to deploy and manage the various distributed applications executing on the computing devices 14. In some cases, this may be referred to as orchestration of the distributed application, which in this case may be a distributed application implemented as a multi-container application in a service-oriented architecture. To this end, in some cases, the container manager 20 may be configured to deploy and configure containers by which the distributed applications are formed. In some embodiments, the container manager 20 may deploy and configure containers based on a description of the distributed application in a composition file in the composition file repository 18.

The container manager 20, in some embodiments, may be configured to provision containers with in a cluster of containers, for instance, by instructing a container engine on a given computing device to retrieve a specified machine image (like an ISO image or a system image) from the image repository 22 and execute that image within a new container. Some embodiments may be configured to schedule the deployment of containers, for instance, according to a policy. Some embodiments may be configured to select the environment in which the provisioned container runs according to various policy stored in memory, for instance, specifying that containers be run within a geographic region, a particular type of computing device, or within distributions thereof (for example, that containers are to be evenly divided between a West Coast and East Coast data center as new containers are added or removed). In other examples, such policies may specify ratios or minimum amounts of computing resources to be dedicated to a container, for instance, a number of containers per CPU, a number of containers per CPU core, a minimum amount of system memory available per container, or the like. Further, some embodiments may be configured to execute scripts that configure applications, for example based on composition files described below.

Some embodiments of the container manager 20 may further be configured to determine when containers have ceased to operate, are operating at greater than a threshold capacity, or are operating at less than a threshold capacity, and take responsive action, for instance by terminating containers that are underused, re-instantiating containers that have crashed, and adding additional instances of containers that are at greater than a threshold capacity. Some embodiments of the container manager 20 may further be configured to deploy new versions of images of containers, for instance, to rollout updates or revisions to application code. Some embodiments may be configured to roll back to a previous version responsive to a failed version or a user command. In some embodiments, the container manager 20 may facilitate discovery of other services within a multi-container application, for instance, indicating to one service executing in one container where and how to communicate with another service executing in other containers, like indicating to a web server service an Internet Protocol address of a database management service used by the web server service to formulate a response to a webpage request. In some cases, these other services may be on the same computing device and accessed via a loopback address or on other computing devices.

In some embodiments, the composition file repository 18 may contain one or more composition files, each corresponding to a different multi-container application. In some embodiments, the composition file repository is one or more directories on a computing device executing the container manager 20. In some embodiments, the composition files are Docker Compose™ files, Kubernetes™ deployment files, Puppet™ Manifests, Chef™ recipes, or Juju™ Charms. In some embodiments, the composition file may be a single document in a human readable hierarchical serialization format, such as JavaScript™ object notation (JSON), extensible markup language (XML), or YAML Ain't Markup Language (YAML). In some embodiments, the composition file may indicate a version number, a list of services of the distributed application, and identify one or more volumes. In some embodiments, each of the services may be associated with one or more network ports and volumes associated with those services.

In some embodiments, each of the services may be associated with an image in the image repository 22 that includes the application component and dependencies of the application component, such as libraries called by the application component and frameworks that call the application component within the context of a container. In some embodiments, upon the container manager 20 receiving a command to run a composition file, the container manager may identify the corresponding repositories in the image repository 22 and instruct container engines 34 on one or more of the computing devices 14 to instantiate a container, store the image within the instantiated container, and execute the image to instantiate the corresponding service. In some embodiments, a multi-container application may execute on a single computing device 14 or multiple computing devices 14. In some embodiments, containers and instances of services may that be dynamically scaled, adding or removing containers and corresponding services as needed, in some cases, responses to events or metrics gathered by a monitoring application.

As noted above, some embodiments may convert multi-container applications into monolithic applications suitable for installation and execution within a single computing device that does not use a container engine to separate different processes of the application. Conversion may be effectuated with a container packager 12 operative to perform the various types of above-described conversions. In some embodiments, the container packager 12 includes a controller 42, a composition parser 44, an image ingest module 46, a dependency consolidator 48, an application consolidator 50, an installation packager 52, and a package deployment module 54. In some embodiments, the controller 42 directs the operation of the other components 46-52 of the container packager 12 and routes communication therebetween. In some embodiments, the controller 42 executes the process of FIG. 2 by making corresponding calls to the various components illustrated, which is some cases, may be software modules, like functions or methods, or in some cases, may be respective services running in different processes or hosts.

In some embodiments, the composition parser 44 may be operative to retrieve a specified composition file (e.g., responsive to a user request or an API call) in the composition file repository 18 and parse that file to detect various tokens indicative of the containers, containers images, services, uniform-resource locators, and network sockets and other resources used by the application. In some embodiments, the composition parser 44 may parse a composition file into a set of services specified by the composition file and associate the services in program state with attributes of the services, like those described above, such as port number, service name, image location, resource addresses, and the like.

In some embodiments, the image ingest module 46 is configured to retrieve images referenced by the composition file and identified as such in a data structure output by the composition parser 44. In some embodiments, the images are container images obtained from the image repository 22. In some embodiments, the container images may include a corresponding application component having application code that when executed effectuates a corresponding service of the multi-container application.

In some embodiments, the retrieved container images also include dependencies of the application component. The term "dependencies" is used herein to refer to software relied upon by the application component to execute for at least some operations. This software may be stored in the same container as the application component. Examples include libraries called by the application component (e.g., libraries imported by code of the application component from a predefined directory within the container filesystem) and frameworks that call the application component from within the same user space instance corresponding to the respective container. In some embodiments, the libraries and frameworks may have an associated version designated in the container image, and in some cases, that version may be one of a plurality of different versions in which the respective library or framework is made available to developers. In some cases, different images for different containers may invoke or be called by the same library or framework, respectively, but by different versions of that library or framework.

In some embodiments, the container images may include a filesystem having a hierarchical directory structure in which code of the application component and dependencies are arranged in various directories. The directories may have names and the filesystem may, thus, have a namespace. In some embodiments, application code and code of dependencies may call various resources, such as executable code, and read or write to various locations in the filesystem corresponding to this directory structure and the associated directory names. For example, a given application component may read or write to a text file at a path of "/application component/logging/transactions.txt," where this path through the filesystem includes delimiters of a "/," directory names of "application component" and "logging," followed by a file name of "transactions.txt." In some cases, such filesystems may include dozens or hundreds of nested directories and related files, and application code and dependency code may be configured to write to and read from such a filesystem or produce errors upon detecting that the expected filesystem is not present. In some embodiments, some of the container images may include filesystem namespaces that conflict, for instance, two of the filesystem namespaces may include the root directory "application component" and use this directory name to refer to different application components in the different respective container images. Similar conflicts may occur with respect to entire paths and filenames and with respect to various dependencies.

In some embodiments, the application components may include code configured to send or receive API requests over a network to or from other services executed by other containers. In some embodiments, this code may indicate how to communicate with these other services by a uniform resource locator (URL) (which is used herein generically herein to also refer to uniform resource identifiers) corresponding to the other service. For example, the URL for a representational state transfer (RESTful) API of a business logic container may be formatted as "http://API.example.com/resources/record 27" and may be sent with a corresponding hypertext transport protocol verb, like get, post, delete, or put. In some embodiments, the container manager or one of the containers may execute a domain name service server, and the other containers may send such URLs to the domain name service server, which may map the URL to an Internet protocol address and port number of an instance of one of the containers executing the specified service. This address may be sent back to the requesting service that sent the URL, and the requesting device may then send messages to the address. Or in some cases, each container may execute its own domain name service server (or store a corresponding lookup table, like in a hosts.txt file) configured by the container manager 20, for instance.

In some embodiments, the container images each include a complete runtime environment for the respective application components, including interpreters or virtual machines with which the application code is executed. Examples include the Java™ virtual machine and the Java™ runtime environment. Other examples include the Python™ runtime environment and the .Net™ runtime environment. In some embodiments, different container images may include the same runtime environments but different versions of the same runtime environment, for example Python 2.7.13 versus Python 3.5.3.

In some embodiments, the image ingest module 46 may retrieve each of these container images from the image repository 22 and interrogate the images to generate a respective image inventory including the filesystem namespace (e.g., a record of each path and filename), libraries and version numbers (or other version identifiers) of those libraries within the container image, frameworks and version numbers (or other version identifiers) of those frameworks within the container image, URLs of other services messaged by the container image, runtime environments and runtime environment version numbers (or other version identifiers) used by the container image, and in some cases namespaces of application code.

In some embodiments, the container images and respective image inventories may be sent to the dependency consolidator 48 via the controller 42. In some embodiments, the dependency consolidator 48 may be configured to consolidate libraries, frameworks, and runtime environments (which is not to suggest that some runtime environments are not libraries or frameworks, or that any other list of items herein does not contain items with a species-genus relationship). In some embodiments, in some cases, consolidating may include determining that two container images have the same dependency with the same version, in which case, in response, a single instance of the dependency may be designated for inclusion in the monolithic application 17.

In some embodiments, in some cases, consolidating may include determining that two container images have the same dependency with different versions. Some embodiments may resolve the dependency conflict with a variety of different techniques. For example, some embodiments may instantiate multiple class loaders, such as multiple instances of a classloader object in Java™, each of the different classloaders having a different name. Some embodiments may load the different versions with a different respective classloader. Some embodiments may then modify application component code by appending the name of the corresponding classloader (i.e., the one used to load the version of a dependency referenced by that component) to code invoking the corresponding library version in the corresponding application component. For example, if a first application component calls Log4j™ version 1 of the Apache™ Log4j library, and a second application component calls version 2 of Log4j™, embodiments may load the Log4j™ version 1 of the library with a class loader named "V1" and modify code in the first application component that recites "LogManager.getLogger(LogManager.ROOT_LOGGER_NAME);" to instead recite "V1.LogManager.getLogger(LogManager.ROOT_LOGGER_NAME)." In some embodiments, similar code in the second application component may be modified to recite "V2.LogManager.getLogger(LogManager.ROOT_LOGGER_NAME);" for a class loader named "V2." In some embodiments, application code may be obtained without source code, and some embodiments may modify byte code to inject the corresponding adjustments.

In some cases, for example, where different versions of the same runtime environment are used by different application components in different containers, or where different versions of the same library are used, the conflict may be resolved by creating different virtual environments, e.g., in the same user space instance, for instance with the Python™ virtualenv tool. In some cases, the virtual environment may include an added directory with an added copy of the corresponding runtime environment, and in some cases the different version of the library, and application code may be modified to reference the specific runtime environment among a plurality of different runtime environments on the same computing device. For example, one virtual environment may include a runtime for Python version 2.7 while another virtual environment may include a runtime for Python version 3.2. These virtual environments may be distinct from virtual machines or containers that operate in separate user-space instances and often consume additional resources of the computing device or involve additional infrastructure, for instance, to emulate hardware or maintaining separate user-space instances. In some embodiments, two application components may execute in the same version of the same runtime environment, but call different versions of the same library. In some cases, this conflict may be resolved by creating two versions of the same runtime environment, each including different versions of the library, and executing the different application components in the different runtime environments.

In some embodiments, after dependencies are consolidated, or concurrent with consolidation of dependencies, or before consolidation of dependencies, some embodiments may provide the image inventories and container images to the application consolidator 50. In some embodiments, consolidating application components from the various container images may include configuring the application components to run within a single user-space instance of an operating system as independent processes, for example, as independent processes each having one or more associated threads, or some embodiments may configure the application components to execute as separate threads of the same process. In some cases, the different application components may be configured to operate as distinct services within the operating system, in some cases, with multiple processes per service. In some cases, each application component from each container image may be configured to run as a separate process in a separate thread asynchronously from the other processes corresponding to the other application components from the other container images. Or in some cases, the application components may be further consolidated to run within a single service, within a single process, or within a single thread, for example, synchronously. Asynchronous consolidation is expected to afford simpler consolidation of processes, as existing container images are often configured to operate asynchronously relative to one another.

Some embodiments may convert code configured to effectuate API requests between various services of the multi-container application across the network to instead effectuate this functionality within a single computing device, without sending messages over a network. This conversion may be accomplished with a variety of different techniques. For example, some embodiments may reconfigure API requests sent between network computing devices in the multi-container application to instead be sent and received from a loopback Internet Protocol (IP) address of the computing device executing the monolithic application. In some cases, this may include updating a domain name service or corresponding lookup table by which uniform resource locators are resolved to network addresses to resolve all such URLs to a single loopback Internet protocol address. In some embodiments, application code may be modified to replace such URLs with the corresponding loopback address and port associated with the called service, rather than modifying a domain name service or lookup table. In some embodiments, packets sent by one process or thread to a loopback IP address may remain within an operating system portion of a network stack, being sent and received by a virtual network interface, in some cases without reaching a physical network interface controller, like those described above. In some cases, messages may be passed between threads, processes, or services via a loopback IP address without the messages being handled by a driver of a network interface. In some cases, those messages may still be encoded for network transmission, for example, as transmission control protocol (TCP) packets having a payload, for instance, encoded in a payload within an Ethernet packet.

In some cases, multiple application components may use the same network port. When those application components are executed on different servers, this is often not an issue, as the different network addresses of the different services disambiguate instances in which the same port is used. On a single computing device, with a single loopback Internet protocol address, this disambiguation technique may not be effective in some cases. To resolve the resulting port usage conflict, some embodiments may add additional loopback Internet protocol addresses to an existing set of loopback Internet protocol addresses of the computing device, or use different existing loopback Internet protocol addresses of the computing device for different services having the same port number. Some embodiments may execute a reverse proxy with a network address translation table that maps the same port and Internet protocol address to different application components executing as different threads, processes, or services and route messages to the appropriate application component based on attributes like session identifiers with the network address translation table. Thus, some embodiments may configure a network address translation table of a reverse proxy server executed by the computing device that executes the monolithic application to resolve contention for a single network socket by multiple application components.

In some embodiments, code of application components that, in the multi-container application, sends messages across the network may be converted into code that makes system calls to an operating system of the computing device executing the monolithic application. For example, an API request to a URL of a different service in a different container may be converted into a system call to the operating system to launch an executable process corresponding to that service in the consolidated application. In some embodiments, the path and query string of the URL may be parsed to identify parameters of the API request, and those parameters may be appended as arguments of the system call, for instance, by listing the parameters with a delimiter, such as a white space, after a system call that instructs the operating system to run an executable corresponding to the called application component. In some embodiments, code of the called application component may be modified to obtain these arguments through the system call rather than through an application layer requests, such in a path or query string of a URL in an API request. To this end, some embodiments may identify a server that monitors a network port of the called application and modify the server code to execute once upon being called, rather than run as a continuous process, and to obtain parameters from the system call and exit by passing those parameters to the appropriate methods or processes, directing program flow to match that of the multi-container version.

In some embodiments code of application components that send messages in the multi-container application across the network may be converted into code that makes function calls to functions within the calling process. Using a technique similar to that described above by which a query string and URL parameters are converted into arguments of a system call, some embodiments may convert the query string and URL parameters into arguments of a function call. In some embodiments, the called application component may be converted into a subroutine, such as a method or function, within a larger process including the calling routine. Passing parameters to a function call is expected to be substantially faster than using a loopback IP address, e.g., with latency less than of 1/5th of that experienced with use of a loopback IP address. However, some embodiments may use loopback IP addresses to avoid additional complexity that arises from more substantial re-factoring of code. In some embodiments, the arguments passed to the function call may be passed between routines executing in the same address space, in the same user space instance, with a shared memory space of the same process. In some embodiments, the function calls may be calls between synchronous or between asynchronously operating routines, such as functions or methods.

In some cases, such as some of those in which application components are consolidated into a single process, some embodiments may analyze application component code to detect namespace conflicts. For example, different application components may use the same global variable name, the same function name, the same method name, the same constant name, or the like, while referring to different data structures or values. Some embodiments may, upon detecting such a conflict, modify the code of the application components to resolve the conflict, for example, by aliasing one or both of the bodies of code using the same token in a way that resolves conflicts across namespaces. Some embodiments may modify the conflicting code by appending a prefix or suffix to the token that is different across the application components, thereby disambiguate in the duplicate references to the same token in the different namespaces.

As with the dependency consolidator 48, in some embodiments, the application consolidator 50 may be operative to modify byte code rather than source code in cases in which source code is not available. Or some embodiments of the dependency consolidator 48 and the application consolidator 50 may operate upon source code.

In some embodiments, the converted contents of the container images output by the dependency consolidator 48 and the application consolidator 50 may be combined in the installation packager 52 and formed into an installation package for the monolithic application 17. In some embodiments, this may include constructing a consolidated filesystem and populating the filesystem with the converted code, dependencies, and other resources, such as modified domain name services and lookup tables or preconfigured reverse proxies. In some embodiments, the installation package may include information that instructs an operating system how the components of the installation package work together to implement the monolithic application, e.g., an inventory of processes or services and relationships therebetween. In some embodiments, the installation package includes resources used by the monolithic application (e.g., images, sound files, video files, fonts, persistent data structures, and the like), a manifest file describing components of the monolithic application (e.g., an inventory of the executable files, locations of the executable files, and the like), and an entry point for execution of the monolithic application (e.g., an executable file that upon being called by the operating system launches the monolithic application 17). In some embodiments, the installation package further includes a cryptographic security certificate of the monolithic application, such as one supplied by a third party that certifies the monolithic application 17 as authentic and authorized, like an entity operating an application store server from which computing devices download various applications, like native applications, executing on mobile devices or on desktop devices.

In some embodiments, the installation package further includes an inventory of resources of the monolithic application and a hash digest, such as and SHA-256 hash, of portions of the installation package. In some embodiments, a computing device may recalculate the hash value based upon the portions of the installation package during installation to determine whether the installation package has been modified, for instance, by a malicious attacker. Upon determining that the calculated hash value does not match the hash digest in the installation package, some embodiments may determine to not install the monolithic application, or upon a match, some embodiments may proceed with installation. In some embodiments, the hash may be based upon all of the installation package other than the hash digest, the application code, or a portion of the manifest file, such as a listing application components. In some embodiments, the installation package may be an installation package suitable for installation in the Windows™ operating system, the Linux™ operating system, the Unix operating system, the Android™ operating system, the iOS™ operating system, or the z/OS operating system. In some embodiments, the installation package may be a single file that may be expanded by a package installer into the respective filesystem and arrangement of resources referenced when executing the monolithic application.

In some embodiments, the installation package may be stored in memory, for example, in the package deployment module 54. In some embodiments, the package deployment module 54 may supply the package to a repository of applications from which applications are downloaded, such as one that supplied a cryptographic certificate within the installation package. Or in some embodiments, the package deployment module 54 may supply the installation package to requesting computing devices, such as computing device 15.

In some embodiments, the computing device 15 may be a computing device without container infrastructure, such as without a container engine, or a computing device where this infrastructure is dormant. In some cases, such infrastructure may be present but unused, for instance, to remain consistent with other systems or policies within an enterprise computing environment. In some embodiments, the computing device 15 is a desktop computer, a rack-mounted computer, a mobile computing device (like a smart phone, tablet, in-dash automotive computer, set-top box, an Internet-of-things appliance, or the like), such as those described below with reference to FIG. 3. In some embodiments, the computing device 15 may include the corresponding components described below with reference to computing devices 14 that are also shown in computing device 15. In some embodiments, the monolithic application may execute within an operating system of the computing device 15 within a single user space instance. Thus, some embodiments may provide a version of the multi-container application that can be executed without container infrastructure or without using container infrastructure, in some cases, without having network access by which different containerized processes communicate with one another.

Figure 2:
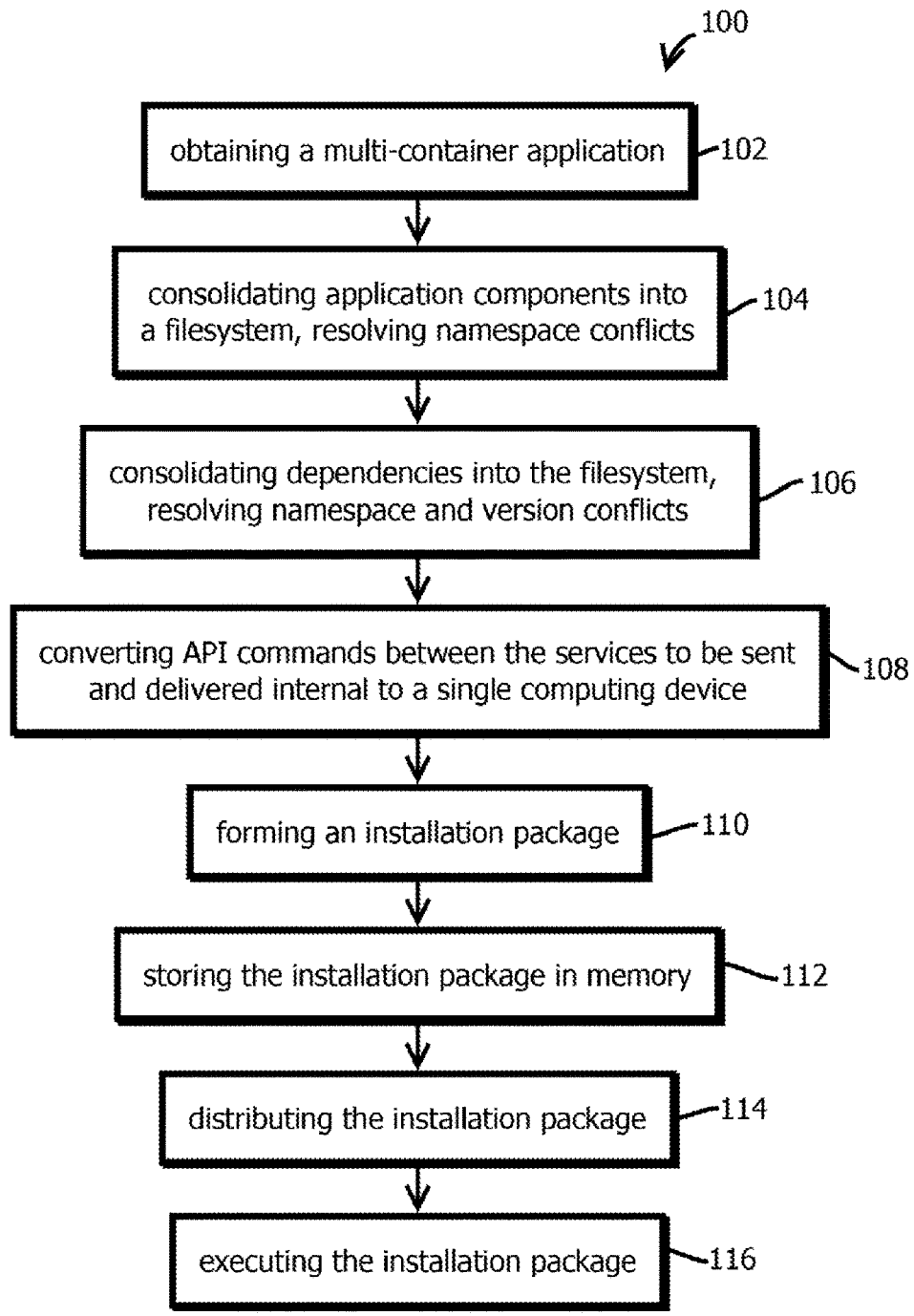
FIG. 2 is a flowchart of an example of a process to convert a multi-container application into a monolithic application in accordance with some embodiments of the present techniques.

FIG. 2 shows an example of a process 100 that may be executed by the above-describe container packager 12, but is not limited to that embodiment, which is not to imply that other described features are limiting. In some embodiments, multiple instances of the process 100, or multiple instances of subsets of the process 100 may be executed concurrently. In some embodiments, the operations may be executed in a different order from that illustrated or operations may be added or removed, none of which is to suggest that other features described herein are limited to the described arrangement. In some embodiments, the process 100 may be initiated upon a developer instructing the container packager 12 to generate a monolithic application version of a multi-container package by calling the controller 42 with a command that includes a composition file in the composition file repository 18 as an argument.

In some embodiments, the process 100 includes obtaining a multi-container application, as indicated by block 102. In some embodiments, this operation may be performed by the above-described composition parser 44 and image ingest module 46. Next, some embodiments may consolidate application components into a filesystem, resolving namespace conflicts, as indicated by block 104. In some embodiments, this operation may be performed by the above-described application consolidator 50. Some embodiments may further consolidate dependencies into the filesystem, resolving namespace and version conflicts, as indicated by block 106. In some embodiments, this may be performed by the above-described dependency consolidator 48. Next, some embodiments may convert application program interface commands (also referred to as API requests or calls) between the services of the multi-container application to be sent and delivered internal to a single computing device, as indicated by block 108. In some embodiments, this operation may be performed by the above-described application consolidator 50. Next, some embodiments may form an installation package, as indicated by block 110, an operation which may be performed by the above-described installation packager 52. Next, some embodiments may store the installation package in memory, as indicated by block 112, an operation which may be performed by the above-described package deployment module 54. Some embodiments may distribute the installation package, as indicated by block 114. This may be performed by the package deployment module 54 directly to computing devices, or by the package deployment module 54 registering the installation package with a third-party service that distributes applications, such as an application store of an entity that provides a mobile operating system. Some embodiments may include executing the installation package, as indicated by block 116. In some cases, this may include installing the installation package and executing the monolithic application therein. In some cases, the monolithic application may be executed on some devices, while the multi-container application version may be executed on other computing devices in other computing environments. Thus, the same multi-container application, once written, may be deployed in a diverse set of computing environments, making the application available to a wider array of users.

Figure 3:
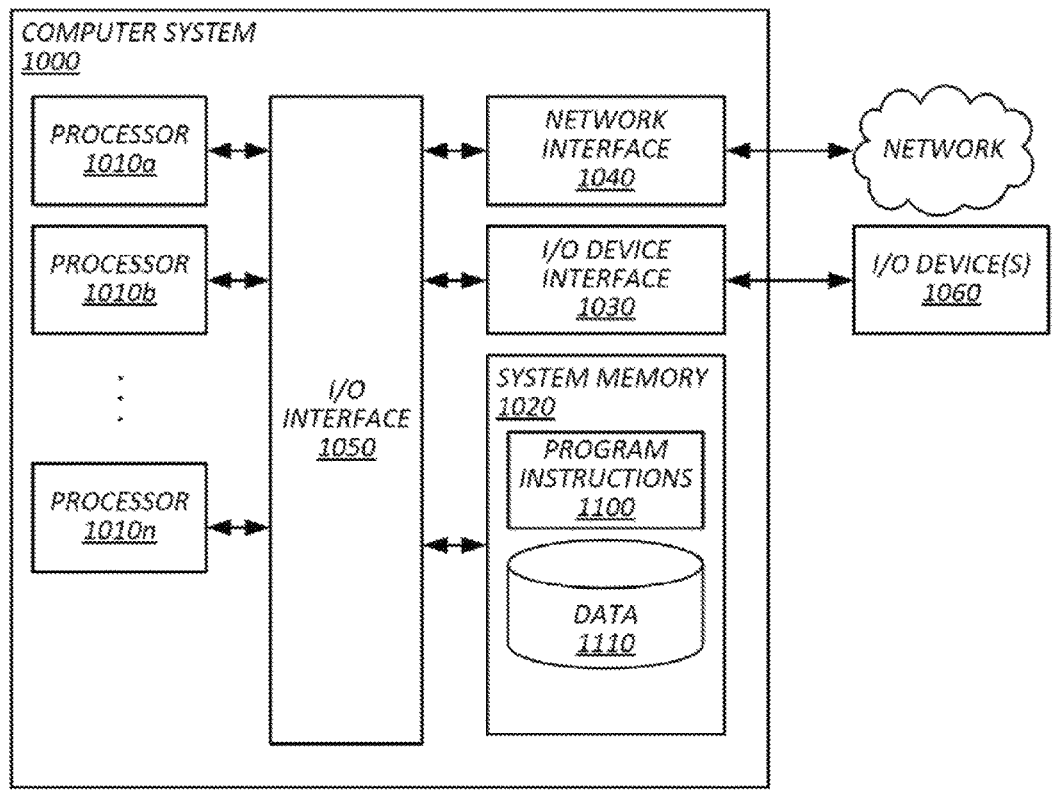
FIG. 3 is a block diagram of an example of a computing device by which the above systems and processes may be implemented.

FIG. 3 is a diagram that illustrates an exemplary computing system (also referred to as a computing device or computer) 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A tangible, non-transitory, machine-readable medium storing instructions that when executed by one or more processors effectuate operations to convert a multi-container application into a monolithic application, the operations comprising: obtaining, with one or more processors, a multi-container application, the multi-container application comprising: a composition file identifying a plurality of container images configured to provide respective services of the multi-container application upon deployment and execution in a respective container of the multi-container application, and the plurality of container images, wherein the container images each comprise different application components of the multi-container application configured to effectuate a different respective service of the multi-container application, the applications components having different application code and different dependencies stored in the respective container images; converting, with one or more processors, the multi-container application into a monolithic application at least in part by: consolidating the application components and dependencies into a single filesystem, and converting code operative to, at least in part, effectuate application-program interface (API) commands sent between the services of the multi-container application to be operative to cause the command to be sent and delivered internal to a single computing device configured to execute the monolithic application; forming, with one or more processors, an installation package comprising the monolithic application, resources used by the monolithic application, and a manifest file describing components of the monolithic application and an entry point for execution of the monolithic application; and storing, with one or more processors, the installation package in memory.

2. The medium of embodiment 1, wherein: the monolithic application comprises a multi-threaded application in which different threads correspond to the different containers of the multi-container application, wherein the different threads are configured to operate in a single user-space instance of an operating system of the computing device configured to execute the monolithic application.

3. The medium of any one of embodiments 1-2, wherein converting the multi-container application into the monolithic application comprises: configuring the API requests sent between the services to be sent to a loopback Internet Protocol (IP) address of a host computing device, wherein packets sent via the loopback IP address are conveyed between different processes of the monolithic application by a virtual network interface of an operating system of the computing device configured to execute the monolithic application.

4. The medium of embodiment 3, wherein configuring the API request sent the between the services comprises: instructing the computing device executing the monolithic application to add at least one loopback IP addresses to an existing set having at least one loopback IP address; configuring a domain-name system (DNS) server of the multi-container application to map at least some uniform resource locators (URLs) of the application components to different loopback IP addresses including at least one added loopback IP address.

5. The medium of embodiment 4, wherein instructing the computing device to add the at least one loopback IP address is performed in response to determining that two of the application components use the same network port number.

6. The medium of any one of embodiments 1-5, comprising: configuring a reverse proxy to resolve contention for a network socket by at least two of the application components by adjusting a network address translation table of the reverse proxy.

7. The medium of any one of embodiments 1-6, wherein converting the multi-container application into the monolithic application comprises: converting API requests sent to a network address into system calls; arranging at least some of the application components as executable files called by the system calls; configuring code in the at least some of the application components configured to receive parameters via a uniform resource locator (URL) path or via a query string of a URL to receive the parameters as arguments of the system calls.

8. The medium of any one of embodiments 1-7, wherein converting the multi-container application into the monolithic application comprises: converting code configured to send an API command to a network address into code configured to make a function call to code configured to be executed in the same address space as a calling function.

9. The medium of any one of embodiments 1-8, wherein converting the multi-container application into the monolithic application comprises: converting code configured to make API requests into code configured to make asynchronous function calls between processes configured to share the same portions of memory of a computing device configured to execute the monolithic application.

10. The medium of any one of embodiments 1-9, wherein converting the multi-container application into the monolithic application comprises: determine that two of the application components call different versions of the same library, the two versions of the library being respective dependencies of different application components in different container images; in response to the determination: creating a first classloader having a first name; creating a second classloader having a second name; loading one version of the library with the first classloader; loading another version of the library with the second classloader; appending the first name to code invoking the library in one of the two application components; and appending the second name to code invoking the library in the other of the two application components.

11. The medium of any one of embodiments 1-10, wherein converting the multi-container application into the monolithic application comprises: determining that two of the application components call different versions of the same library; and in response to the determination, creating two virtual environments in the same user-space instance, the two virtual environments being in the same user-space instance, the two virtual environments having at least partially duplicative runtime components and each having a different one of the different versions of the same library.

12. The medium of any one of embodiments 1-11, wherein converting the multi-container application into the monolithic application comprises: determining that two of the application components have conflicting namespaces; and in response to the determination, resolving the conflicting namespaces by aliasing at least one conflicting token in at least one of the two application components.

13. The medium of any one of embodiments 1-12, wherein converting the multi-container application into the monolithic application comprises: determining that two application components have conflicting filesystem namespaces; and placing at least one of the two applications in a parent directory configured to resolve the conflict and modifying filesystem references in application code of the at least one of the two applications to account for the parent directory.

14. The medium of any one of embodiments 1-13, wherein: the multi-container application comprises: a server container configured to receive web or API request via a network socket; a business logic container configured to execute business logic responsive to requests received by the server; and a database container configured to store data upon which the business logic container operates; the installation package is an installation package configured to be deployed in a mobile operating system; and the installation package comprises: a cryptographic security certificate of the monolithic application; a list of resources of the monolithic application; and a hash digest based on at least part of the manifest file.

15. A method, comprising: the operations of any one of embodiments 1-14.

16. A system, comprising: one or more processors; and memory storing instructions that when executed by the processors cause the processors to effectuate operations comprising: the operations of any one of embodiments 1-14.

What is claimed is:

1. A tangible, non-transitory, machine-readable medium storing instructions that when executed by one or more processors effectuate operations to convert a multi-container application into a monolithic application, the operations comprising:
   obtaining, with one or more processors, a multi-container application, the multi-container application comprising:
      a composition file identifying a plurality of container images configured to provide respective services of the multi-container application upon deployment and execution in a respective container of the multi-container application, and
      the plurality of container images, wherein the container images each comprise different application components of the multi-container application configured to effectuate a different respective service of the multi-container application, the applications components having different application code and different dependencies stored in the respective container images;
   converting, with one or more processors, the multi-container application into a monolithic application at least in part by:
      consolidating the application components and dependencies into a single filesystem, and
      converting code operative to, at least in part, effectuate application-program interface (API) commands sent between the services of the multi-container application to be operative to cause the command to be sent and delivered internal to a single computing device configured to execute the monolithic application;
   forming, with one or more processors, an installation package comprising the monolithic application, resources used by the monolithic application, and a manifest file describing components of the monolithic application and an entry point for execution of the monolithic application; and
   storing, with one or more processors, the installation package in memory.

2. The medium of claim 1, wherein:
   the monolithic application comprises a multi-threaded application in which different threads correspond to the different containers of the multi-container application, wherein the different threads are configured to operate in a single user-space instance of an operating system of the computing device configured to execute the monolithic application.

3. The medium of claim 1, wherein converting the multi-container application into the monolithic application comprises:
   configuring the API requests sent between the services to be sent to a loopback Internet Protocol (IP) address of a host computing device, wherein packets sent via the loopback IP address are conveyed between different processes of the monolithic application by a virtual network interface of an operating system of the computing device configured to execute the monolithic application.

4. The medium of claim 3, wherein configuring the API request sent the between the services comprises:
   instructing the computing device executing the monolithic application to add at least one loopback IP addresses to an existing set having at least one loopback IP address;
   configuring a domain-name system (DNS) server of the multi-container application to map at least some uniform resource locators (URLs) of the application components to different loopback IP addresses including at least one added loopback IP address.

5. The medium of claim 4, wherein instructing the computing device to add the at least one loopback IP address is performed in response to determining that two of the application components use the same network port number.

6. The medium of claim 1, comprising:
configuring a reverse proxy to resolve contention for a network socket by at least two of the application components by adjusting a network address translation table of the reverse proxy.

7. The medium of claim 1, wherein converting the multi-container application into the monolithic application comprises:
converting API requests sent to a network address into system calls;
arranging at least some of the application components as executable files called by the system calls;
configuring code in the at least some of the application components configured to receive parameters via a uniform resource locator (URL) path or via a query string of a URL to receive the parameters as arguments of the system calls.

8. The medium of claim 1, wherein converting the multi-container application into the monolithic application comprises:
converting code configured to send an API command to a network address into code configured to make a function call to code configured to be executed in the same address space as a calling function.

9. The medium of claim 1, wherein converting the multi-container application into the monolithic application comprises:
converting code configured to make API requests into code configured to make asynchronous function calls between processes configured to share the same portions of memory of a computing device configured to execute the monolithic application.

10. The medium of claim 1, wherein converting the multi-container application into the monolithic application comprises:
determine that two of the application components call different versions of the same library, the two versions of the library being respective dependencies of different application components in different container images;
in response to the determination:
creating a first classloader having a first name;
creating a second classloader having a second name;
loading one version of the library with the first classloader;
loading another version of the library with the second classloader;
appending the first name to code invoking the library in one of the two application components; and
appending the second name to code invoking the library in the other of the two application components.

11. The medium of claim 1, wherein converting the multi-container application into the monolithic application comprises:
determining that two of the application components call different versions of the same library; and
in response to the determination, creating two virtual environments in the same user-space instance, the two virtual environments being in the same user-space instance, the two virtual environments having at least partially duplicative runtime components and each having a different one of the different versions of the same library.

12. The medium of claim 1, wherein converting the multi-container application into the monolithic application comprises:
determining that two of the application components have conflicting namespaces; and
in response to the determination, resolving the conflicting namespaces by aliasing at least one conflicting token in at least one of the two application components.

13. The medium of claim 1, wherein converting the multi-container application into the monolithic application comprises:
determining that two application components have conflicting filesystem namespaces; and
placing at least one of the two applications in a parent directory configured to resolve the conflict and modifying filesystem references in application code of the at least one of the two applications to account for the parent directory.

14. The medium of claim 1, wherein:
the multi-container application comprises:
a server container configured to receive web or API request via a network socket;
a business logic container configured to execute business logic responsive to requests received by the server; and
a database container configured to store data upon which the business logic container operates;
the installation package is an installation package configured to be deployed in a mobile operating system; and
the installation package comprises:
a cryptographic security certificate of the monolithic application;
a list of resources of the monolithic application; and
a hash digest based on at least part of the manifest file.

15. The medium of claim 1, wherein converting the multi-container application into the monolithic application comprises:
steps for converting a multi-container application into a monolithic application.

16. A method, comprising:
obtaining, with one or more processors, a multi-container application, the multi-container application comprising:
a composition file identifying a plurality of container images configured to provide respective services of the multi-container application upon deployment and execution in a respective container of the multi-container application, and
the plurality of container images, wherein the container images each comprise different application components of the multi-container application configured to effectuate a different respective service of the multi-container application, the applications components having different application code and different dependencies stored in the respective container images;
converting, with one or more processors, the multi-container application into a monolithic application at least in part by:
consolidating the application components and dependencies into a single filesystem, and
converting code operative to, at least in part, effectuate application-program interface (API) commands sent between the services of the multi-container application to be operative to cause the command to be sent and delivered internal to a single computing device configured to execute the monolithic application;
forming, with one or more processors, an installation package comprising the monolithic application, resources used by the monolithic application, and a manifest file describing components of the monolithic application and an entry point for execution of the monolithic application; and storing, with one or more processors, the installation package in memory.

17. The method of claim 16, wherein:

the monolithic application comprises a multi-threaded application in which different threads correspond to the different containers of the multi-container application, wherein the different threads are configured to operate in a single user-space instance of an operating system of the computing device configured to execute the monolithic application.

18. The method of claim 16, wherein converting the multi-container application into the monolithic application comprises:

configuring the API requests sent between the services to be sent to a loopback Internet Protocol (IP) address of a host computing device, wherein packets sent via the loopback IP address are conveyed between different processes of the monolithic application by a virtual network interface of an operating system of the computing device configured to execute the monolithic application.

19. The method of claim 16, wherein converting the multi-container application into the monolithic application comprises:

determining that two of the application components have conflicting namespaces; and in response to the determination, resolving the conflicting namespaces by aliasing at least one conflicting token in at least one of the two application components.

20. The method of claim 16, comprising:

executing the installation package.

* * * * *